US011880177B2

(12) United States Patent
Duesterberg

(10) Patent No.: US 11,880,177 B2
(45) Date of Patent: Jan. 23, 2024

(54) CONTROL DEVICE FOR CONTROLLING AN ELECTRIC MOTOR

(71) Applicant: Lenze Automation GmbH, Aerzen (DE)

(72) Inventor: Dirk Duesterberg, Emmerthal (DE)

(73) Assignee: Lenze Automation GmbH, Aerzen (DE)

( * ) Notice: Subject to any disclaimer, the term of this patent is extended or adjusted under 35 U.S.C. 154(b) by 776 days.

(21) Appl. No.: 16/967,603

(22) PCT Filed: Feb. 5, 2019

(86) PCT No.: PCT/EP2019/052763
§ 371 (c)(1),
(2) Date: Jun. 9, 2021

(87) PCT Pub. No.: WO2019/154801
PCT Pub. Date: Aug. 15, 2019

(65) Prior Publication Data
US 2022/0214651 A1    Jul. 7, 2022

(30) Foreign Application Priority Data
Feb. 6, 2018 (DE) .................. 10 2018 201 837.5

(51) Int. Cl.
*G05B 15/02* (2006.01)
(52) U.S. Cl.
CPC .................. *G05B 15/02* (2013.01)

(58) Field of Classification Search
CPC ........... G06F 2119/08; H02K 41/0354; H02M 1/0012; G01K 15/00; G01K 7/16; H02P 29/64
See application file for complete search history.

(56) References Cited

U.S. PATENT DOCUMENTS

| 2012/0030390 A1 | 2/2012 | Kreuzer et al. |
| 2017/0264295 A1* | 9/2017 | Slattery ............ G01R 31/31712 |
| 2020/0136552 A1 | 4/2020 | Burgermeister |

FOREIGN PATENT DOCUMENTS

| DE | 10 2004 048 928 A1 | 4/2006 |
| DE | 10 2008 000 501 A1 | 9/2009 |
| DE | 10 2017 210 440 A1 | 12/2018 |

(Continued)

OTHER PUBLICATIONS

International Search Report (PCT/ISA/210) issued in PCT Application No. PCT/EP2019/052763 dated May 3, 2019 with English translation (six (6) pages).

(Continued)

*Primary Examiner* — Antony M Paul
(74) *Attorney, Agent, or Firm* — Crowell & Moring LLP

(57) ABSTRACT

A controller for controlling an electric motor includes an interface having a first connection pole and a second connection pole, wherein the interface is designed to connect a measuring resistor and to connect a digital encoder. The controller is designed to evaluate a resistance value of the measuring resistor in order to monitor the temperature of the electric motor when the measuring resistor is connected to the interface, and the controller is designed to receive digital data from the digital encoder at the interface when the digital encoder is connected to the interface.

11 Claims, 1 Drawing Sheet

(56) References Cited

FOREIGN PATENT DOCUMENTS

EP  2 098 930 A1  9/2009
EP  2 413 554 A2  2/2012

OTHER PUBLICATIONS

German-language Written Opinion (PCT/ISA/237) issued in PCT Application No. PCT/EP2019/052763 dated May 3, 2019 (six (6) pages).
German-language Office Action issued in German Application No. 10 2018 201 837.5 dated Jan. 30, 2019 (six (6) pages).
"TI Designs Two-Wire Interface to a Hiperface DSL Encoder", Texas Instruments, Sep. 1, 2015, XP055581791, (71 pages).
Sick-Steg, "HIPERFACE-Beschreibung. Description of the HIPERFACE Interface", Jan. 1, 2008, XP007905326, with English translation (62 pages).

* cited by examiner

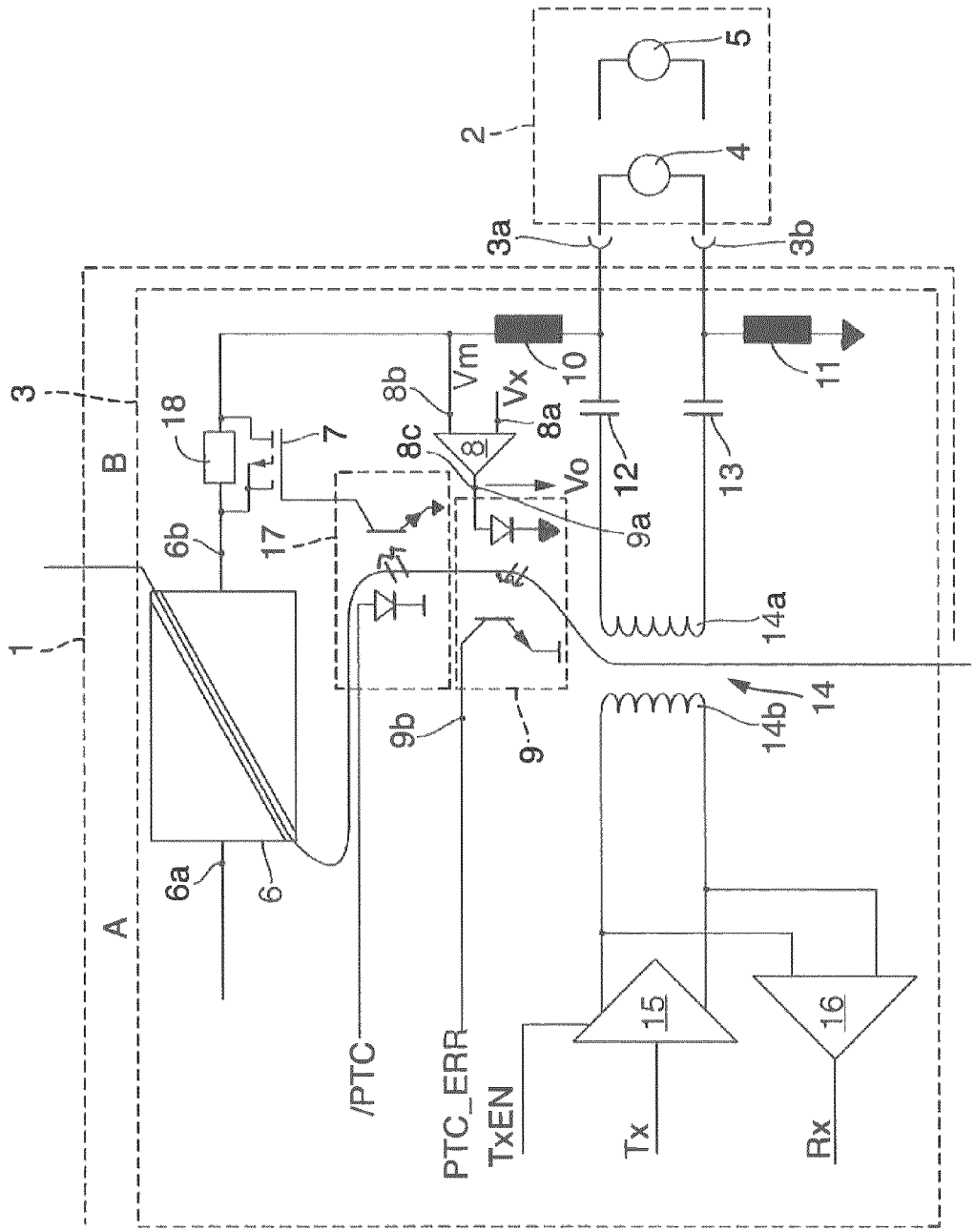

CONTROL DEVICE FOR CONTROLLING AN ELECTRIC MOTOR

BACKGROUND AND SUMMARY OF THE INVENTION

The invention relates to a controller for driving an electric motor.

Conventional electric motors driven by way of a controller may have a measuring resistor the resistance value of which is evaluated by the controller in order to monitor the temperature of the electric motor. To this end, conventional controllers typically have a dedicated two-pole analog interface to which the measuring resistor, typically a PTC resistor, is connected.

Also known are digital encoders or sensors that digitally transmit their measured value, for example an angle of rotation position of the motor, to the controller. The conventional controllers usually have a dedicated digital interface for the connection of these digital encoders.

The invention is based on the object of providing a controller that allows a connection of different sensors that is as flexible as possible.

The invention achieves this object by way of a controller according to the independent claims.

The controller is used to drive an electric motor, for example a synchronous motor or an asynchronous motor.

The controller has an, in particular precisely one, two-pole interface having a first connection pole and a second connection pole.

The interface is designed both for the connection of a measuring resistor and for the connection of a digital encoder. The measuring resistor and the digital encoder are preferably not able to be coupled to the interface at the same time, that is to say either the measuring resistor or the digital encoder is able to be coupled or is coupled to the interface at one time.

The controller is designed to evaluate a resistance value of the measuring resistor in order to monitor the temperature of the electric motor if or for as long as the measuring resistor is connected to the interface. By way of example, an excess temperature of the electric motor may be determined if or as soon as the resistance value exceeds a threshold value.

The controller is also designed to receive digital data from the digital encoder at the or via the interface, if or for as long as the digital encoder is connected to the interface.

According to one embodiment, the controller has a power supply having an input terminal and an output terminal that is galvanically isolated from the input terminal. The power supply may for example generate an output voltage at its output voltage terminal from an input voltage at its input terminal, for example a DC voltage having a level in a range between 5 V and 48 V. For this case, the controller has a (structural) element having a controllable resistance, wherein the element having a controllable resistance is looped in between the output terminal of the galvanically isolating power supply and the first connection pole. The element may for example be driven such that a minimum or ideally disappearing resistance value is brought about when the digital encoder is connected to the interface. If the measuring resistor is connected to the interface, the element may for example be driven such that a defined resistance value different from zero is brought about. The resistance that occurs, together with the measuring resistor, then forms a voltage divider, wherein the voltage that occurs at the center tap of the voltage divider is a measure of the resistance value of the measuring resistor.

According to one embodiment, the element having a controllable resistance is a field-effect transistor.

According to one embodiment, the controller also has a comparator having a first input terminal, a second input terminal and an output terminal. A reference voltage having a defined level is applied to the first input terminal. A measurement voltage is applied to the second input terminal, wherein the measurement voltage depends on the resistance value of the measuring resistor. An output voltage is generated at the output terminal by way of the comparator, the level of which output voltage is dependent on whether the measurement voltage is greater than or less than the reference voltage. According to this embodiment, the controller furthermore has an optocoupler having an input terminal and an output terminal, wherein the input terminal of the optocoupler is connected to the output terminal of the comparator. The output terminal of the optocoupler therefore has a state that depends on whether the measurement voltage is greater than or less than the reference voltage, that is to say that depends on whether a temperature of the measuring resistor exceeds a threshold value.

According to one embodiment, the controller also has a transformer having a first winding and a second winding, wherein the second winding is galvanically isolated from the first winding. Also provided is a first coil that is looped in between the element having a controllable resistance and the first connection pole. Correspondingly provided is a second coil that is looped in between the second connection pole and a reference potential. Also provided is a first capacitor that is looped in between the first connection pole and a first terminal of the first winding. Correspondingly provided is a second capacitor that is looped in between the second connection pole and a second terminal of the first winding. The coils serve for the AC decoupling and the capacitors serve for the DC decoupling of signals that are present at the interface poles.

According to one embodiment, the controller also has a transmission driver that is designed to apply a voltage profile to the second winding that is dependent on data to be transmitted to the digital encoder. Correspondingly provided is a reception amplifier that is designed to extract data from a voltage profile or signal profile present on the second winding, which data are transmitted by the digital encoder to the controller and are received at the interface.

According to one embodiment, the controller is designed to receive digital data from the digital encoder at the interface in accordance with the Hiperface DSL standard, the SCS open link standard or the BISS Line standard when an encoder is connected to the interface in accordance with one of said standards.

According to one embodiment, the controller is a frequency converter.

The invention is described in detail below with reference to the drawing.

BRIEF DESCRIPTION OF THE DRAWING

FIG. 1 is a schematic diagram of a controller according to an embodiment of the invention for driving an electric motor.

DETAILED DESCRIPTION OF THE DRAWING

FIG. 1 shows a controller 1 in the form of a frequency converter for driving an electric motor 2.

The controller 1 has an interface 3 having a first connection pole 3a and a second connection pole 3b.

The interface has two regions A and B that are galvanically isolated from one another.

The interface is used both for the connection of a measuring resistor 4, here by way of example in the form of a PTC resistor (PTC: positive temperature coefficient), and for the connection of a digital (single-cable) encoder 5. Either the measuring resistor 4 or the digital encoder 5 is connected to the interface 3 at one time.

The digital encoder 5 may be for example a digital rotary encoder having a Hiperface DSL interface, an SCS open link interface or a BISS Line interface. The digital encoder may digitally transmit a plurality of different measured variables, for example an angle of rotation position and additionally a motor temperature.

Depending on whether the measuring resistor 4 or the digital encoder 5 are connected to the interface 3, the controller 1 evaluates a resistance value of the measuring resistor 4 in order to monitor the temperature of the electric motor or receives digital data from the digital encoder 5.

The controller 1 or its interface 3 furthermore has a power supply 6 having an input terminal 6a and an output terminal 6b that is galvanically isolated from the input terminal 6a.

Also provided is an element 7 having a controllable resistance in the form of a field-effect transistor (FET), wherein the FET 7 is looped in, together with a first coil 10, between the output terminal 6b of the galvanically isolating power supply 6 and the first connection pole 3a. A resistor 18 is connected in parallel with the FET.

A resistance value of the FET 7 is set by way of a low-active signal/PTC that is transmitted to a gate terminal of the FET 7 via an optocoupler 17. For as long as the measuring resistor 4 is connected to the interface 3, the signal/PTC is selected such that the drain-source path of the FET 7 has a high-resistance resistance value. The resultant resistance is in this case defined by the resistance value of the resistor 18. For as long as the digital encoder 5 is connected to the interface 3, the signal/PTC is selected such that the drain-source path of the FET 7 is ideally short-circuited.

The controller 1 also has a transformer 14 having a first winding 14a and a second winding 14b that is galvanically isolated from the first winding 14a.

In addition to the first coil 10 that is looped in between the FET 7 and the first connection pole 3a, the controller 1 furthermore has a second coil 11 that is looped in between the second connection pole 3b and a reference potential, for example ground.

The controller 1 also has a first capacitor 12 that is looped in between the first connection pole 3a and a first terminal of the first winding 14a. The controller 1 also has a second capacitor 13 that is looped in between the second connection pole 3b and a second terminal of the first winding 14a.

The controller 1 or its interface 3 also has a comparator 8 having a first input terminal 8a, a second input terminal 8b and an output terminal 8c. A reference voltage Vx is applied to the first input terminal 8a, a measurement voltage Vm is applied to the second input terminal 8b and an output voltage Vo is output at the output terminal 8c, the level of which output voltage Vo is dependent on whether the measurement voltage Vm is greater than or less than the reference voltage Vx.

The measurement voltage Vm is dependent on the resistance value of the measuring resistor 4 when the measuring resistor 4 is connected, since the FET 7 or its drain-source path has a high resistance and the resistor 18 connected in parallel with the FET 7 forms a voltage divider with the measuring resistor 4, meaning that the level of the measurement voltage Vm depends on the temperature of the measuring resistor 4.

The controller 1 or its interface 3 also has an optocoupler 9 having an input terminal 9a and an output terminal 9b, wherein the input terminal 9a of the optocoupler 9 is connected to the output terminal 8c of the comparator 8. A state of an output signal PTC_ERR at the output terminal 9b of the optocoupler 9 therefore depends on whether the temperature of the measuring resistor 4 is less than or greater than a temperature threshold value that corresponds to the reference voltage Vx.

The controller also has a transmission driver 15 that is designed to apply a voltage profile to the second winding 14b that is dependent on data Tx to be transmitted. The transmission driver 15 is activated by way of an activation signal TxEN.

Correspondingly provided is a reception amplifier 16 that is designed to extract data RX transmitted by the digital encoder 5 from a voltage profile present on the second winding 14b, which data are received via the interface 3.

Conventional controllers have a dedicated analog interface to which a measuring resistor, when this is present in the electric motor, is able to be connected. A single-channel encoder, when this is present in the electric motor, is connected to a digital interface, separate from the analog interface, of the conventional controller. According to the invention, instead of this, just a single interface 3 is provided for both application cases, to which interface both analog measuring resistors 4 and digital (single-cable) encoders 5 are able to be connected.

The digital encoder 5, when this is connected, is supplied with operating power separately from region A of the interface 3 by way of the power supply 6. Data is transmitted via the isolated transformer 14. The capacitors 12 and 13 and the coils or inductors 10 and 11 isolate power supply and data from one another. The digital encoder 5 may be connected via the two connection poles 3a and 3b, which may form a two-pole plug.

The measuring resistor 4, when this is connected, is likewise evaluated in a galvanically isolated manner by way of the isolated power supply 6, comparator 8 and optocoupler 9. As an alternative, this may take place through an inductive feed and measurement of a primary current of the transformer 14.

The FET 7, which is not in the on state in this case, ensures that the high-resistance operating resistor 18 becomes active, this forming a voltage divider with the measuring resistor 4 and making it possible to evaluate the measuring resistor 4 using the comparator 8.

The changeover between the "resistance measurement" and "digital encoder" operating modes is achieved by way of the low-active signal/PTC. When the signal/PTC is not active, the circuit of the encoder 5 is activated by way of the optocoupler 17 by virtue of the FET 7 being switched into the on state. The signal TxEN may also be evaluated for the changeover, since data are transmitted only in the "digital encoder" operating mode. In the "resistance measurement" operating mode, the signal TxEN is constant, that is to say the signal/PTC is able to be derived from the signal TxEN.

A high integration density is able to be achieved due to the dynamically changeable operating modes, since just a single plug on the controller 1 is required for both operating modes. It is also not necessary to keep any variants available, since both operating modes are able to be implemented by way of the same controller. Both operating modes may be implemented via a motor cable.

It goes without saying that the controller 1 or the frequency converter, in addition to the interface 3 shown in FIG. 1, may also comprise other components, for example an H6 bridge circuit for generating drive signals for the electric motor 2, analog and digital circuits, further sensors etc. Reference is made to the relevant specialist literature in this respect.

The digital encoder 5 may be what is known as a single-cable encoder. Reference is likewise made to the relevant specialist literature in this respect.

It goes without saying that the controller 1 may have further interfaces for driving the electric motor 2, for example interfaces for outputting phase voltages, etc. Unlike illustrated in FIG. 1, the measuring resistor 4 and/or the digital encoder 5 might not be part of the motor 2, that is to say be designed separately from the motor 2, but be functionally connected to the motor 2.

What is claimed is:

1. A controller for driving an electric motor, comprising:
   an interface having a first connection pole and a second connection pole,
   wherein
   the interface is designed for connection of a measuring resistor and for connection of a digital encoder,
   the controller is designed to evaluate a resistance value of the measuring resistor in order to monitor temperature of the electric motor when the measuring resistor is connected to the interface, and
   the controller is designed to receive digital data from the digital encoder at the interface when the digital encoder is connected to the interface.

2. The controller according to claim 1, further comprising:
   a power supply having an input terminal and an output terminal that is galvanically isolated from the input terminal; and
   an element having a controllable resistance,
   wherein the element having the controllable resistance is looped in between the output terminal of the galvanically isolating power supply and the first connection pole.

3. The controller according to claim 2, wherein
   the element having the controllable resistance is a field-effect transistor.

4. The controller according to claim 2, further comprising:
   a comparator having a first input terminal to which a reference voltage is applied, a second input terminal to which a measurement voltage is applied, wherein the measurement voltage is dependent on a resistance value of the measuring resistor, and an output terminal on which an output voltage is present, a level of the output voltage being dependent on whether the measurement voltage is greater than or less than the reference voltage; and
   an optocoupler having an input terminal and an output terminal, wherein the input terminal of the optocoupler is connected to the output terminal of the comparator.

5. The controller according to claim 4, further comprising:
   a transformer having a first winding and a second winding that is galvanically isolated from the first winding;
   a first coil that is looped in between the element having the controllable resistance and the first connection pole;
   a second coil that is looped in between the second connection pole and a reference potential;
   a first capacitor that is looped in between the first connection pole and a first terminal of the first winding; and
   a second capacitor that is looped in between the second connection pole and a second terminal of the first winding.

6. The controller according to claim 5, further comprising:
   a transmission driver that is designed to apply a voltage profile to the second winding that is dependent on data to be transmitted; and
   a reception amplifier that is designed to extract data transmitted by the digital encoder from a voltage profile present on the second winding, which data are received via the interface.

7. The controller according to claim 2, further comprising:
   a transformer having a first winding and a second winding that is galvanically isolated from the first winding;
   a first coil that is looped in between the element having the controllable resistance and the first connection pole;
   a second coil that is looped in between the second connection pole and a reference potential;
   a first capacitor that is looped in between the first connection pole and a first terminal of the first winding; and
   a second capacitor that is looped in between the second connection pole and a second terminal of the first winding.

8. The controller according to claim 7, further comprising:
   a transmission driver that is designed to apply a voltage profile to the second winding that is dependent on data to be transmitted; and
   a reception amplifier that is designed to extract data transmitted by the digital encoder from a voltage profile present on the second winding, which data are received via the interface.

9. The controller according to claim 1, wherein
   the controller is designed to receive digital data from the digital encoder at the interface in accordance with at least one of: Hiperface DSL standard, SCS open link standard or the BISS Line standard, when the digital encoder is connected to the interface.

10. The controller according to claim 1, wherein
    the controller is a frequency converter.

11. The controller according to claim 1, further comprising:
    a comparator having a first input terminal to which a reference voltage is applied, a second input terminal to which a measurement voltage is applied, wherein the measurement voltage is dependent on a resistance value of the measuring resistor, and an output terminal on which an output voltage is present, a level of the output voltage being dependent on whether the measurement voltage is greater than or less than the reference voltage; and
    an optocoupler having an input terminal and an output terminal, wherein the input terminal of the optocoupler is connected to the output terminal of the comparator.

* * * * *